(12) United States Patent
Loaiza (10) Patent No.: US 6,834,025 B1
(45) Date of Patent: Dec. 21, 2004

(54) WORLD GLOBE POCKET CLOCK AND WORLD GLOBE DESK CLOCK

(76) Inventor: Miguel Guillermo Ochoa Loaiza, 2506 S. Allison Ct., Lakewood, CO (US) 80227

( * ) Notice: Subject to any disclaimer, the term of this patent is extended or adjusted under 35 U.S.C. 154(b) by 0 days.

(21) Appl. No.: 10/634,129

(22) Filed: Aug. 4, 2003

Related U.S. Application Data (63) Continuation of application No. 09/741,501, filed on Dec. 18, 2000, now Pat. No. 6,603,709.
(60) Provisional application No. 60/172,088, filed on Dec. 23, 1999, now abandoned.

(51) Int. Cl.[7] .............................................. G04B 19/22
(52) U.S. Cl. ........................................................ 368/23
(58) Field of Search ........................ 368/15, 17, 21–24

(56) References Cited

U.S. PATENT DOCUMENTS

| | | | | |
|---|---|---|---|---|
| 2,068,417 A | * | 1/1937 | Konkle | 184/105.3 |
| 2,492,785 A | * | 12/1949 | Concordet | 434/143 |
| 2,785,528 A | * | 3/1957 | Kernick | 368/24 |
| 3,049,863 A | * | 8/1962 | Ranney | 368/24 |
| 3,197,893 A | * | 8/1965 | Mariotti | 434/143 |
| 3,292,361 A | * | 12/1966 | Redmond | 368/23 |
| 3,305,946 A | * | 2/1967 | Du Gardin | 434/143 |
| 3,370,415 A | * | 2/1968 | McIlvaine | 368/24 |
| 3,823,548 A | * | 7/1974 | Riba | 368/21 |
| 4,308,604 A | * | 12/1981 | Graham | 368/23 |
| 5,008,867 A | * | 4/1991 | Ko | 368/23 |
| 5,132,946 A | * | 7/1992 | Tanaka | 369/30.24 |
| 5,379,271 A | * | 1/1995 | Moedt | 368/24 |

\* cited by examiner

Primary Examiner—Vit W. Miska
(74) Attorney, Agent, or Firm—Ramon L. Pizarro; Edwin H. Crabtree (57) ABSTRACT

A time keeping device that provides a user with the time of day at any point on earth and the current day or night condition of any point on earth. The time keeping device includes a translucent external globe indicia for indicating time and an internal globe rotatably mounted within the external globe, and a support mechanism adapted for rotating the internal globe about a pair of axis, so that the time at a particular point on the internal globe can be read by a user by peering through the external globe to see the location of the indicia as projected on the internal globe.

2 Claims, 10 Drawing Sheets

WORLD GLOBE POCKET CLOCK AND WORLD GLOBE DESK CLOCK

REFERENCE TO RELATED APPLICATIONS

This application is a continuation of my patent application Ser. No. 09/741,501, filed Dec. 18, 2000, now U.S. Pat. No. 6,603,709 incorporated herein in its entirety by reference, which claims the benefit of my provisional application having serial No. 60/172,088, filed Dec. 23, 1999, now abandoned.

BACKGROUND OF THE INVENTION (a) Field of the Invention

The field of endeavor to which this invention pertains is Globe Clocks as defined in the U.S. Patent Classification and Subclassification Definition: 368/23 Globe/Clock Horology Time Measuring Systems and Devices. This invention pertains in particular to world globe in combination with a mechanism which rotates a device inside an scaled earth globe in such a manner that the current lightened and darkened portions of the earth are accurately displayed in accordance with the current combination of the Rotation and Translation movements of the Earth relative to the Sun. Additionally month, day, hour and minute readings are displayed from inside of the globe in a very easy way to read and to set-up.

(b) Discussion of Known Art

Our basic notion of time comes from the fact that earth completes one full cycle from vernal equinox to the next vernal equinox traveling around the sun (Tropical Year Cycle) while completing approximately 366.2421926 revolutions (Day Cycle) about its approximately 23 degrees 27 minutes slopped axis relative to its plane of traveling. The Tropical Year Cycle is mainly associated with the definition of seasons, months and days. The Day Cycle is mainly related to the definition of hours, minutes and seconds. Earth's 366.2421926 revolutions over its own axis counterclockwise (looking down from the north pole for this application) produces the same effect as if we maintained the globe static and rotate sunlight reflection over earth's surface in the opposite direction, clockwise. Earth's traveling around the sun counterclockwise produces the same effect as if we rotate sunlight reflection over the earth's surface in the same direction, counterclockwise. These two facts make us see only 365.2421926 noons per year: 366.2421926 counterclockwise minus one (−1) clockwise. Because earth motion about sunlight is the master clock of our lives, numerous inventions have been disclosed in the prior art intending to reproduce sunlight's motion over earth's surface. There were inventions focused on reproducing only the Day Cycle with out considering the Tropical Year Cycle, failing therefore to deliver an effect even slightly close to reality. Some others have looked for to reproduce the Day Cycle and replace the Tropical Year Cycle with an oscillating plate shaped light shield 6 to amend their inability to replicate the complexity of the actual motion.

[6] All the same Patents called in Footnote No.0

Other inventors have come out with the correct arrangement of the moving parts to realize such a combination of movements. However they[4] have failed in the next challenge that is to figure out a train of gears that accurately give us a 1:366.2421926 ratio between two shafts, this complexity has kept inventors from reaching the goal of a precise mechanism. In Dec. 1, 1965 Du Gardin filed a patent application with a train of gears that promised to give us a 1:366.2422 ratio which was remarkable closed to the actual one. Unfortunately this train of gears was wrong, two main mistakes made it fail: a) A loop between differential arrangement 26b and shaft 32 produced the train of gears to get stuck and b) a mathematical mistake when summarizing 1/366.24+1/0.0022 was intended to equate 1/366.2422, it was wrong. Even if this equation had been solved correctly, the differential arrangement had not had delivered a direct addition of speeds. The differential gear produces a transfer of speed from the highest pressure shaft (A) of the differential beveled gears (wheels in a truck for instance) to the lowest pressure side (B) with a result equals to the differential main gear speed (C) (the speed coming from the motor of a truck for instance) plus the differential main gear speed (C) multiplied by: one (1) minus (−) the highest pressure shaft speed (A) divided by the differential gear speed (C). Outlet speed $X = A + (A \times (1 - A/C))$.

[4] All the same Patents called in Footnote No.2 except T. Du Gardin.

With inventors spending time in figuring out an effective solution to this complex combination of motions, no one has been able to solve the remaining problems: How to release the external world globe form the moving mechanism so users may handle it with out impacting the driving train as prior art2 does? How to display time while visually teaching its mechanics as prior art fails to do? How to arrange a simple setup system that anybody could use? How to reduce this complexity to a cost effective design that may be massproduced?

[1] Examples: N. Concordet, 1949, U.S. Pat. No. 2,492,785, F. Miltenberg, 1954, U.S. Pat. No. 2,680,308, T. Du Gardin, 1967, U.S. Pat. No. 3,305,946, E. R. Davis, 1992, Pat. No. 5,132,946.

[2] Examples: P. Kayak, 1937, U.S. Pat. No. 2,068,417, N. Concordet, 1949, U.S. Pat. No. 2,492,785, F. Miltenberg, 1954, U.S. Pat. No. 2,680,308, E. T. Kemick, 1957, U.S. Pat. No. 2,785,528, B. C. Ranney, 1962, U.S. Pat. No. 3,049,863, A. Mariotti, 1965, U.S. Pat. No. 3,197,893, T. Du Gardin, 1967, U.S. Pat. No. 3,305,946, H. A. Mcivaine, 1968, Pat. No. 3,370,415, E. R. Davis, 1992, U.S. Pat. No. 5,132,946. ** only these two have Day and Year Cycles and day automatically driven.

SUMMARY

In this disclosure I am introducing two basic arrangements of moving parts that I have named: The World Globe Clock and The Based World Globe Clock. The first one has its driving mechanism inside of the globe and it is battery powered, the second one uses a base to house the driver and it may be battery or AC powered. Both arrangements are based in the same principle that is to have an exterior hollowed part with a planetary gear attached to it, a second part pivotally mounted in to the first hollowed part with a gear pinion in mesh with the planetary gear of first part to provide rotation inside and about to it. And a third part pivotally mounted on the second part, arranged in a different pivotal angle so it may be rotated about to the second part. Each of these two arrangements may be driven in two different ways: the first way is with a stepper motor providing the Day Cycle frequency and a train of gear that I will disclose later to reduce this frequency with a 1:366.2421927519 ratio which is extremely close to the actual one 1:366.2421926; in fact the difference represent only 0.0097 seconds per year. The second way to drive them is with two different stepper motors, the first one programmed to provide the Day Cycle frequency and the other one programmed to provide the Tropical Year Cycle frequency meeting with electronic precision the ratio of 1:366.2421926. Both arrangements disclosed hereby have all the advantages of the Prior Art and none of the disadvantages, and more important than that, they introduce new advantages not seen before. Both the World Globe Clock and Based World Globe Clock display with precision the current lightened and darkened hemispheres of the world, the time of the year (month and day), the time of the day (hour and minute), seasons, equinoxes, solstices and zeniths. In order get these inventions done several pieces an arrangements have been invented, like the very unique Hour Band that instead of dial rings placed outside or underneath the earth globe that the Previous Art3 proposes makes the association between time readings and its geographic areas visually easy to co-relate. This Hour Band in combination with the Month and Day Dial fully solves the problem of how to display time while visually teaching its mechanics, problem that all the prior art3 has A Watch Type Setup System that enables the World Globe Clock and Based World Globe Clock a simple and easy setup without prior understanding of astronomic principles.

3 All the same Patents called in Footnote No.2.

Instead of the plate shaped light shield used by the previous art1 to depict Day and Night, I am introducing a half darkly and half lightly colored second globe that I have named Day-Night Globe. This globe emulates the imaginary globe formed by the half lightened and half darkened hemispheres of the earth with out the need to have a source of light and high power consumption. Instead of performing the relative movements of the earth surface to the sunlight as the Prior Art2 does, the mechanism I am disclosing hereby is doing the opposite, it is performing all the relative movements of the sunlight (represented by the Day-Night Globe) to the earth surface (Earth Globe), this way I have released the earth surface from the need to rotate and being bounded to the driving mechanism. By doing so I am also allowing the earth globe the freedom to be manipulated by its user. Instead of performing one (1) round every twenty four (24) hours as most of the Previous Art4 does, the mechanism I am disclosing performs accurately both Day Cycle and Tropical Year Cycle.

4 All the same Patents called in Footnote No.2 except T. Du Gardin.

Instead of gradually slopping the darkened and lightened areas of the earth and coming back to its vertical to show the effect of its translation as some the Previous art6 does, by the disclosure of a very unique double-axis feature and the day-night globe previously explained, I am realizing the actual performance of the sunlight about the earth surface. The day-night globe gives one (1) rotation around the surface of the earth every year, on an axis slopped approximately 23 degree 27 minutes from the north-south axis of the earth.

6 All the same Patents called in Footnote No.0

The World Globe Clock version mainly encompasses the following elements: a transparent earth globe, a half dark and half light colored inside globe to emulate the day and night, an hour and minute band, a month and day dial, an inside special double-axis, housing structure, an automatic driving mechanism, a battery to provide power, and a special setup system.

On the other hand the Based World Globe Clock follows the same principles and has the same advantages the World Globe Clock has with the following differences: in this alternative the globe is mounted on a base, the driving mechanism is housed inside the base, it may be Battery or AC powered, it may be illuminated from inside the globe. The Based World Globe Clock option mainly encompasses the following elements: either a transparent or a translucent earth globe, either a half lightly painted and half darkly painted globe or a rotating plate shaped shield to emulate the day and night, an hour and minute band, a month and day dial, an inside double-axis, an alternative light bulb and socket if earth globe is chosen not transparent but translucent, a base formed by three hollow cylinders pivotally nested one inside of the other, a Driving System that includes an stepper motor and circuitry for control and train of gears to relate the Day Cycle and Tropical Year Cycle or an alternative two-stepper-motor Driving System, an alternative electrical AC adapter and a special Setup System. All of these fixtures in a stronger, more accurate, easier, and cheaper way to fabricate than the previous art does. All these parts will be explained further in the detailed description of the invention.

Thus, a Transparent World Globe with a Double Axis System pivotally mounted on the World Globe and a Day-Night Globe pivotally mounted to the Double Axis System. (World Globe Clock) has been disclosed.

Also, this arrangement of a Transparent or Translucent World Globe with an Extended Cylinder underneath allows the use of a Double Axis System with an Extended Cylinder underneath is pivotally mounted to it by means of bearings and a Day-Night Globe or a Revolving Shade is pivotally mounted to the Double Axis System. The Train of Gears can include a first section the reduce speed with an approximately ratio of half the resultant ratio with approximation of 2 decimals and a second section that reduces the speed to approximately the remaining resultant decimals and a differential gear system that combines this ratios for a final result equals at least with 6 decimals of precision. Additionally, a Driving mechanism including 2 stepper motors with their electronic drivers and gears or a Driving Mechanism including 1 stepper motor and the train of gears in claim 3 to reach a ratio of approximately 1: 366.2421927519 between Translation and Rotation of Earth.

Additionally, it is contemplated that a Setup System including: a Pressure Gear Clutch, a Setup Stick with different geometrical sections with a handle attached to it, a setup gear with a cavity with different shapes to track and release the Setup Stick, and an hole with different sections in the Double Axis System to track and release the Setup Stick, plus an hour band system with pivots to be tracked by slots revolving in two directions at the same time, plus a Month and Day Dial system with a pointer hand to indicate time could also be used to create the movement of the double globe arrangement. This driving mechanism may also include 2 stepper tors, each with their electronic drivers and gears or a Driving chanism including 1 stepper motor and the train of gears in claim to reach a ratio of approximately 1: 366.2421927519 between anslation and Rotation of Earth. Still further, it is ntemplated that a Setup System including: a Pressure Gear Clutch, Setup Stick with different geometrical sections with a handle tached to it, a setup gear with a cavity with different shapes to ack and release the Setup Stick, and an hole with different ctions in the Double Axis System to track and release the Setup ick, plus an hour band system with pivots to be tracked by slots volving in two directions at the same time, plus a Month and Day al system with a pointer hand to indicate time.

BRIEF DESCRIPTION OF THE DRAWINGS

The accompanying drawings illustrate preferred embodiments of the present invention according to the best mode presently devised for making and using the instant invention, and in which: World Globe Clock

DETAILED DESCRIPTION OF EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
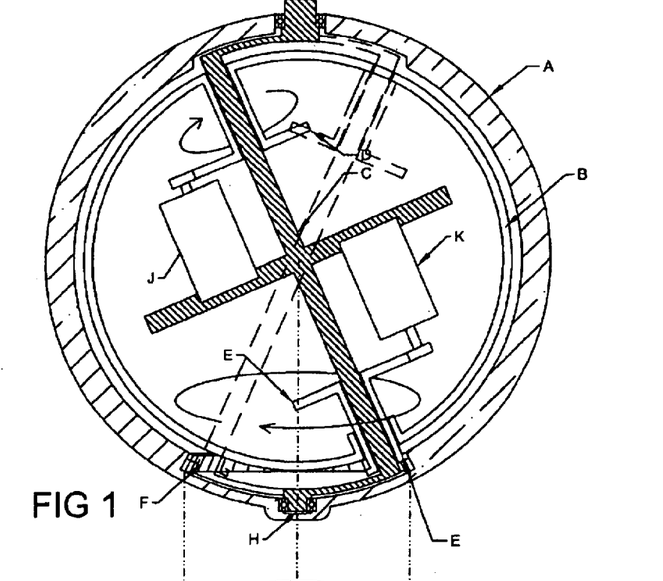
FIG. 1 is a simplified section of the World Globe Clock arrangement.
Figure 2:
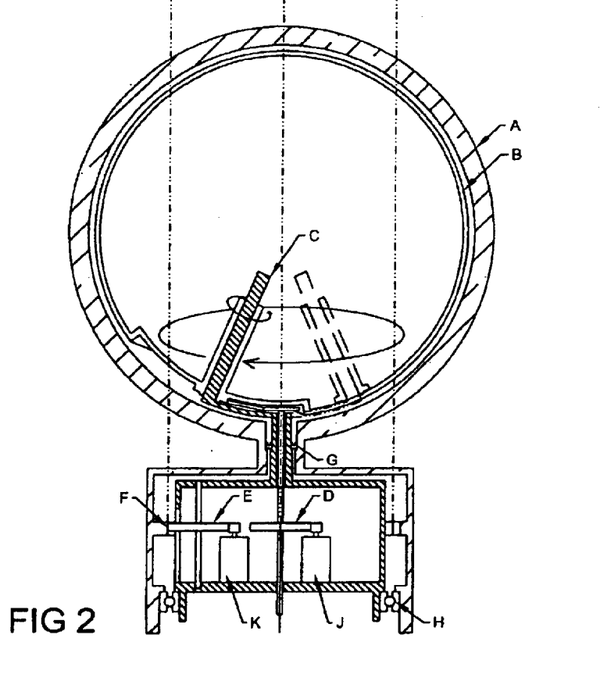
FIG. 2 is a simplified section of the Based World Globe Clock arrangement.

Most of the pieces that the World Globe Clock and Based World Globe Clock encompass may be molded from polymers of different types in accordance with the requirements of transparency, refraction, friction, opaqueness, resistance and weight of each element. Some other pieces have to be manufactured from metals like the motor driver, the pressure clutch device, gear shafts and circuitry. FIG. 1 is simplified representation of the basic kinetics of the World Globe Clock Arrangement and FIG. 2 is a simplified representation of the basic kinetics of the Based World Globe Arrangement.

In FIG. 1 we see a housing globe (A) with a second part, the double axis (C), pivotally mounted over pivots (G) and (H), this double axis revolves vertically relative to the housing globe driven by the force of driver motor (K). The smaller pinioned end of gear (E) which tracks the planetary gear (F) molded in the interior face of the housing globe (A) transmits this torque. By this mean piece (C) revolves 366.2421926 times per year inside the housing globe (A). A third part is added to this arrangement, the inside globe (B), pivotally mounted to the slopped axis of double axis (C). This inside globe (B) is revolved once a year about the approximately 23 degree 27 minutes slopped axis by means of driving motor J which tracks gear (D). This gear (D) is directly attached to the inside globe (B). In this manner, the basic mechanism of the World Globe Clock is setup to replicate sunlight performance over the surface of earth. Motors (J) and (K) are programmed to provide the frequency that meets the 1:366.2421962 ratio between the slopped spin and the vertical rotation. In a similar way, in FIG. 2 we can see a different approach to the same concept, the Based World Globe Clock. We have a housing globe (A) that is extended underneath in a cylindrical shape. A second part, the double axis (C) is also cylindrically extended inside the housing globe (A) cylinder, this second cylinder is also pivotally mounted on bearings (G) and (H). The double axis (C) Cylinder revolves vertically relative to the housing globe cylinder driven by the force of driver motor (K). Gear (E) tracks the planetary gear (F) molded in the interior face of the housing globe (A). By these means, piece (C) revolves 366.2421926 times per year inside the housing globe (A). A third part is added to this arrangement, the inside globe (B), pivotally mounted to the slopped axis of double axis (C). This inside globe (B) is revolved once a year about the approximately 23 degree 27 minutes slopped axis by means of driving motor J which tracks gear (D). This gear (D) is directly attached to the inside globe (B). Now after explaining the foundations of these inventions, I am going to disclose the physical approaches that provide us a solution first for the World Globe Clock and later for the Based Word Globe Clock. Each piece that World Globe Clock encompasses is identified by a number on the drawings and in a parenthesis in this description. World Globe Clock.

Figure 3:
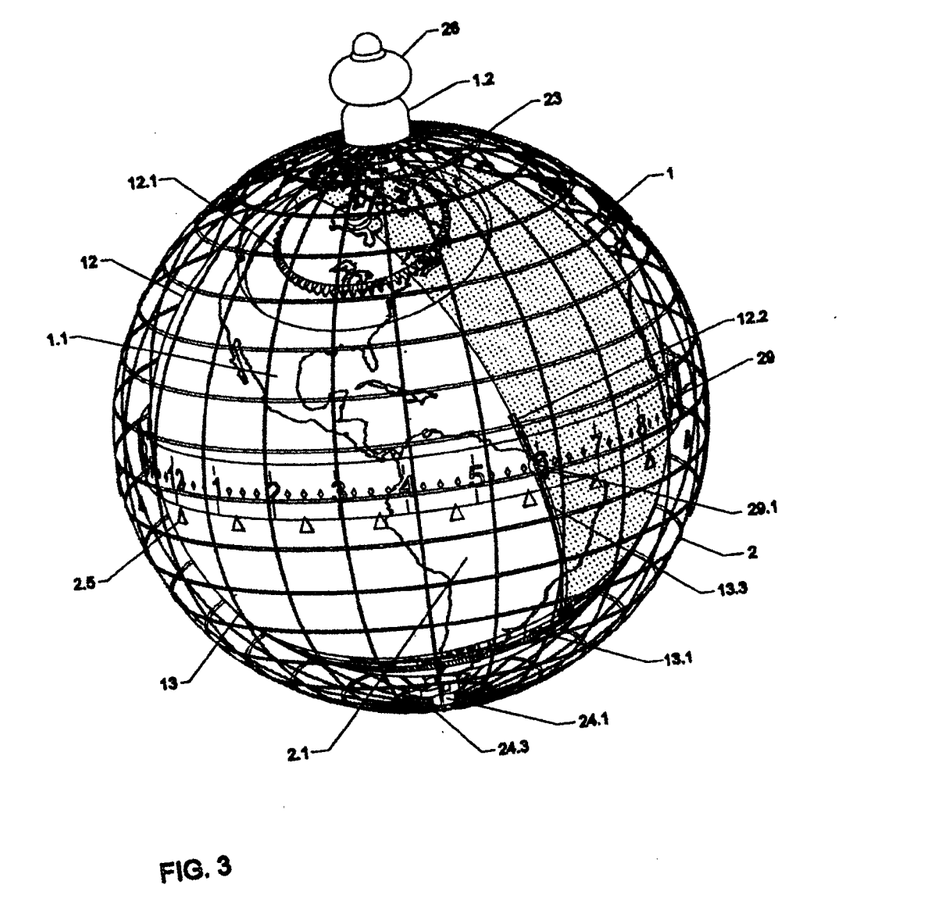
FIG. 3 is a perspective view of a physical solution for the World Globe Clock arrangement two driving motors.

FIG. 3 provides us an idea of what World Globe Clock may be. The housing element is a Transparent Earth Globe formed by two hemispheres (1) and (2). A geographical Map of the Earth (1.1) and (2.1) corresponding to each hemisphere includes: continents, oceans, islands, meridians, parallels, ecuador, tropics, and polar circles depicted on its surface, this elements may be transparently tinted or molded. At its north pole the Setup Housing (1.2) is placed, this part also serves as a pivot for the double axis system. The south hemisphere of the World Globe (2.1) has 24 Time Reading Pointers (2.5) distributed along its ecuador; each one corresponds to a one of the 24-hour bands of the earth. We can also appreciate in this figure some of the characteristics of the Day-Night Globe seen through the transparent World Globe. The Day-Night Globe is also formed by two hemispheres (12) and (13) joining at its ecuador, in its vertical direction half of it is darkly colored and the other half is lightly colored as represented by the shading in the drawing. The upper hemisphere of the Day-Night Globe has a Setup Beveled Gear (12.1) molded around its ecuador, this gear is provided to allow the globe manual rotation about its slopped axis by turning the Setup Handle (26) from the vertical axis when the World Globe Clock is setup. The Setup mechanism is detailed later in FIG. 9 explanation. The sketched arrow around the Day-Night Globe north pivot represents its normal anticlockwise direction of spin over its slopped axis; this motion is given in imperceptible discrete jumps to complete only a full round per year in accordance with the Tropical Year Cycle. The Day and Month Dial (13.1) is depicted on the south hemisphere of the Day-Night Globe and while it performs the previous explained cycle the Day-Month Pointer Hand (24.3) that is part of the Double Axis System indicates Season, Month and Day of the Year. This Month-Day Dial has 365.2421927519 divisions each one corresponding to a day of the year. We can also partially notice in this drawing the North Arm (23), this arm is part of the Double Axis System that makes possible the rotation of the Day-Night Globe in two different axes at the same time. This North Arm (23) along with the South Arm (24) not completely appreciated in this figure, normally revolve about the North-South vertical axis in clockwise direction as it is indicated by the arrow near to the ecuador of the World Globe (1)/(2). Both Arms complete 366. 2421927519 rounds while one full Tropical Year Cycle is reached. We can also see the South Bearing Mounted Pivot (24.1). The other fixture that we can also appreciate in this view is the Hour Band (29), this is a transparent skinny band nested in a special grove molded in the interior face of the World Globe (1)/(2). This Band has two series of numbers form one to twelve lineally distributed around its length, each number indicates the correspondent hour of the day; the space between numbers is also subdivided in 4 spaces to identify 15 minutes intervals. The band has a couple of pivots (29.1)

attached to it, this pivots are placed exactly at 6:00 PM and 6:00 AM positions sticking in the band to track Day Night Globe Carrier Slots (12.2) and (13.3) molded in the Day-Night Globe, the slots are strategically placed at its Day-Night division line. The described arrangement allows the Hour Band to be carried by the motion of the Day-Night Globe without loosing its position on the earth globe ecuador and take both different rotations with out getting stuck. The band accurately displays the hour and minute of the day on each and every Standard Time Band of the World.

Figure 4:
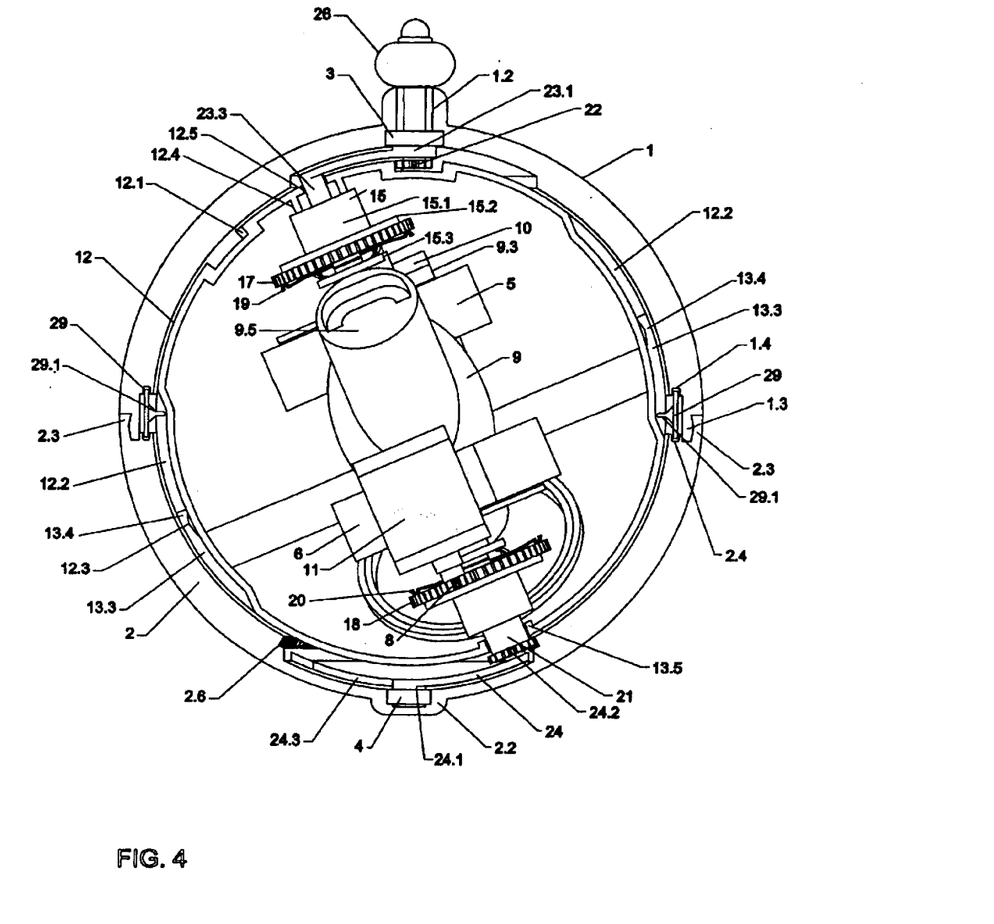
FIG. 4 is a section of FIG. 3.

FIG. 4 gives us a good understanding of how World Globe Clock internal mechanism works. A Planetary Beveled Gear (2.6) is molded inside the South Hemisphere of the Transparent World Globe (2) around its pole. A Double Axis System is formed by the North Arm (23), South Arm (24) and the Housing Structure (9) fixedly interconnected among them. The Housing Structure (9) is placed approximately 23 degrees 27 minutes slopped relative to the vertical North-South World Globe Axis. The North Arm Setup Housing Pivot (23.1) is inserted in the North Bearing (3) which is itself inserted into the World Globe North Hole (1.2) providing loosen swing to the Arm. Similarly, South Arm Pivot (24.1) is inserted into South Bearing (4) which is itself inserted into South Pivot Nest (2.2). This arrangement allows the Double Axis System Freedom to revolve about a North South Axis. Tube Pinion (21) is mounted on the south end of the Housing Structure (9) in mesh with Planetary Gear (2.6); Tube Pinion (21) is fixedly connected to Day Clutch (16) that carries Day Friction Gear (18); the friction gear is secured to the Clutch Plate (16.2) by means of the Year Pressure Device (20); the pressure device is tightened into place by means of the Clutch Slot (16.3). Day Driver (6) by means of its pinion (8) provides Motion to this train of gears producing the Double Axis System to revolve around the North South vertical axis in a clockwise direction with a frequency of 366.2421927519 revolutions per Year. Loosely mounted on the Double Axis System we found the Day Night Globe (12)/(13) by the means of Mounting Holes (12.5) and (13.5). This globe is provided at its north end with a Connector Tube (12.4), the tube is fixedly connected to Year Clutch (15) that carries Year Friction Gear (17); the friction gear is secured to the Clutch Plate (15.2) by means of the Year Pressure Device (19); the pressure device is tightened into place by means of the Clutch Slot (15.3). Day Driver (5) by means of its pinion (7) (not shown in this drawing for being behind) provides Motion to the train of gears producing the Day-Night Globe (12) to revolve around the slopped axis in a counterclockwise direction with a frequency of 1 revolution per Year. Year Driver (5) and Day Driver (6) are both fixedly mounted to Housing Structure (9). Battery Compartment (9.5) may be either molded or secured to the Housing Structure (9). Day Driver Clamps (11) and (10) are securing Day Driver (6) and Year Driver (5) into position. Pop-up joint Snaps (1.3) and (2.3) are molded to the correspondent Transparent World Globe Hemispheres (1) and (2) allowing the globe to be easily opened. Similar Pop-up joint Snaps (12.3) and (13.4) are molded to the correspondent Day-Night Globe Hemispheres (12) and (13) allowing the globe an easy opening. Hour Band (29) is nested into Nesting Grooves (1.4) and (2.4) providing loosen direction to the band motion. Day-Night Globe Carrier Slots (12.2) and (13.3) allow pivots (29.1) to be pushed by the Day and Night Globe (12)/(13) motion. In this way Hour and Minute of the day are currently displayed in every Standard Time Band of the world.

Figure 5:
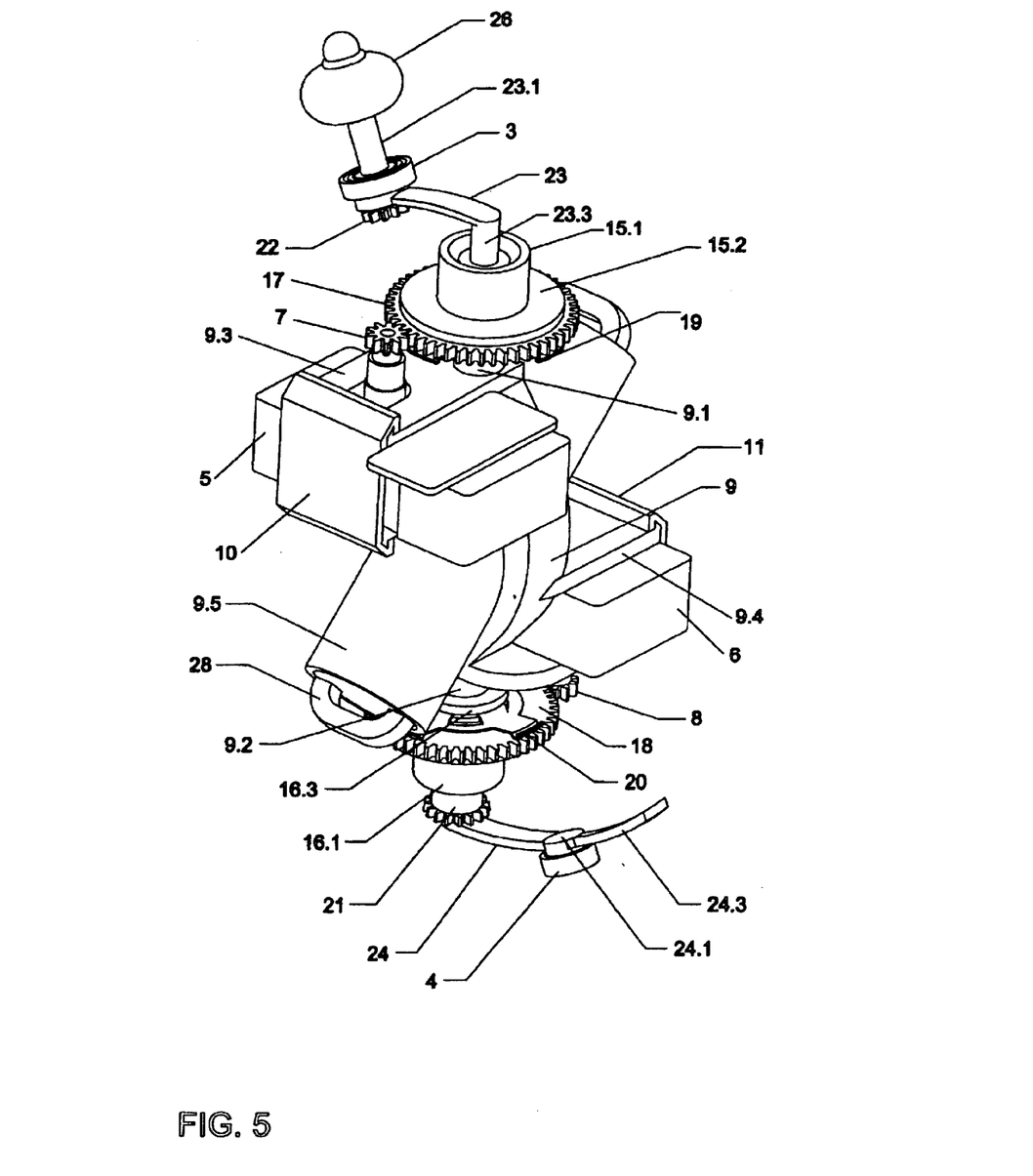
FIG. 5 is a perspective view of the mechanism of FIG. 3 (World Globe, Day Night Globe and Hour Band not shown for clarity).

FIG. 5 allows us a good visualization of how the parts and pieces are put together. We can see that the Housing Structure holds the driving system and battery in it and at the same time works as the slopped axis of the Double Axis System that give rigidity to the structure. Also you may notice that the arrangement is symmetrically balanced to keep the center of inertia at the center of the total piece. Arrows indicate the normal direction of the gear motion. Housing Structure Plates (9.3) and (9.4) hold the Year Driver (5) and Day Driver (6) respectively while Driver Clamps (10) and (11) secure the drivers into position. Drivers (5) and (6) may be either stepper motors with microprocessors providing proper frequency or Quartz Clock Movements with modified microprocessor frequencies. Battery Housing Lid (28) holds the Battery (27) inside the Battery Housing (9.5). The Lid is threaded secured.

Figure 6:
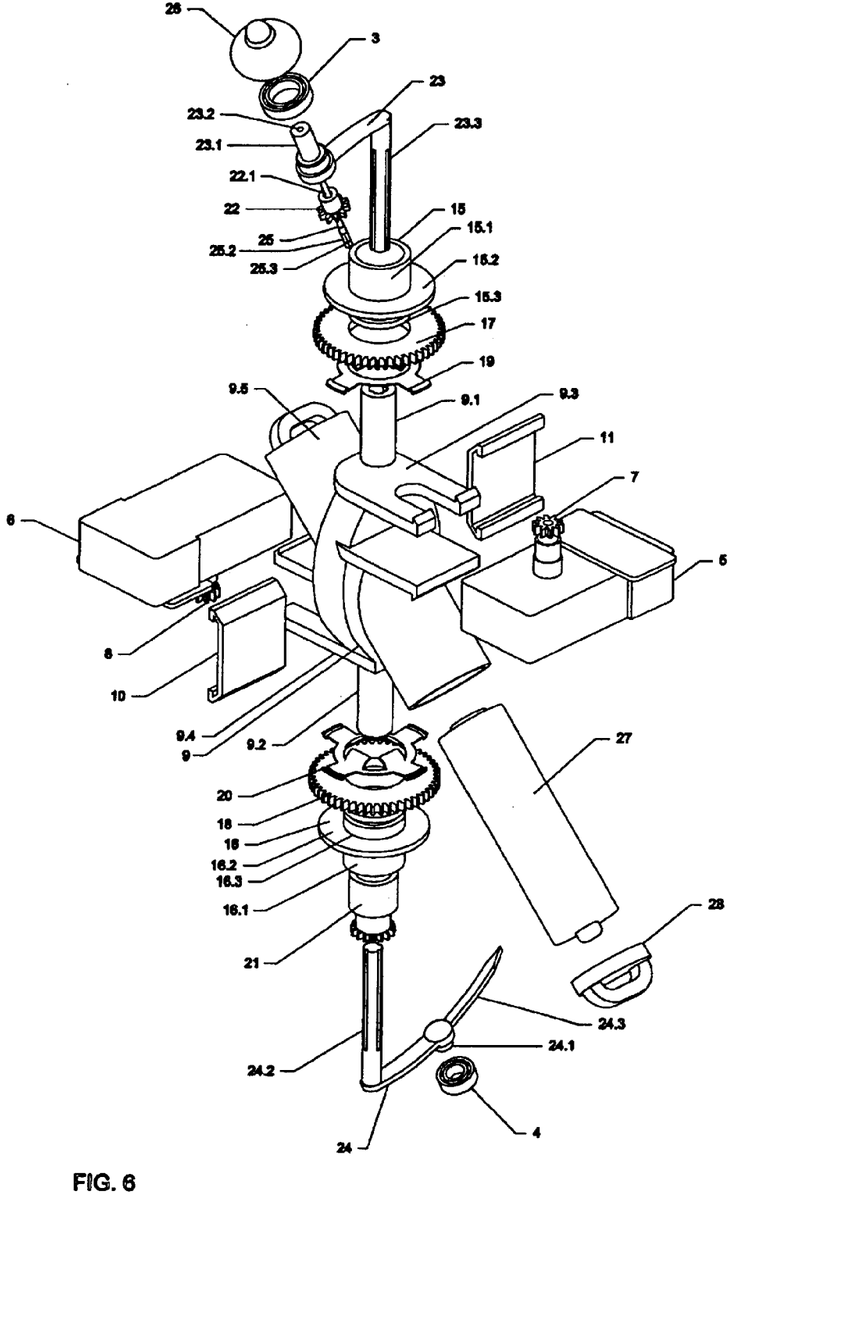
FIG. 6 is an exploded view of FIG. 5.
Figure 7:
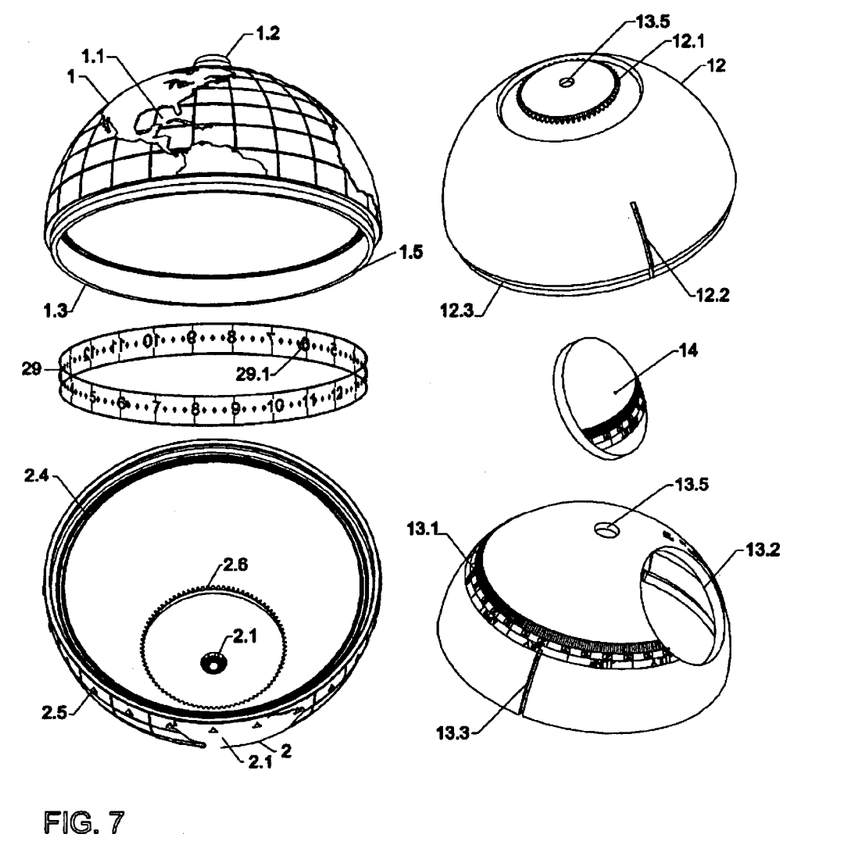
FIG. 7 is a perspective view of the World Globe, Day Night Globe and Hour Band.

FIG. 6 is an exploded view of FIG. 5 allowing us to understand the form of connection between the pieces. In FIG. 7 we can see the remaining pieces not shown in FIG. 5 and FIG. 6 for clarity. The Transparent World Globe (1)/(2) is here detailed (not transparent representation). We are able to appreciate its Pop-up joint Snaps (1.3) and (2.3), its Hour Band Nesting Grooves (1.4) and (2.4). We can also see the Time Reading Pointers (2.5) distributed at the center of each Meridian. The Earth Map (1.1) and (2.1) is also shown. Right at the Interior wall of the South Hemisphere (2) we can appreciate the Planetary Molded Gear (2.6). The Day-Night Globe North Hemisphere (12) includes a Mounting Hole (12.5), a Molded Beveled Gear (12.1) to facilitate setting up the time of the Year, the Hour Band Carrier Slot (12.2) and the Pop-up joint Snap (12.3). You can also see the division line between day and night (12.6). The Day-Night Globe South Hemisphere (13) includes a Mounting Hole (13.5), the Day and Month Dial (13.1) depicted on its surface, the Hour Band Carrier Slot (13.3) and the Pop-up joint Snap (13.3). You can also see the Day-Night Division Line (13.6); it is important to notice that the spring and fall solstices dates on the Day and Month Dial (13.1) must be depicted to match the Day-Night Division Line (13.6), and for the spring solstice date April must be at the day side and February at the night side of the Day-Night Globe. Additionally in this figure you can appreciate the Transparent Hour Band (29) and its couple of Pivots (29.1), the Battery Replacement Opening (13.2) and The Battery Globe Lid (14).

Figures 8, 9:
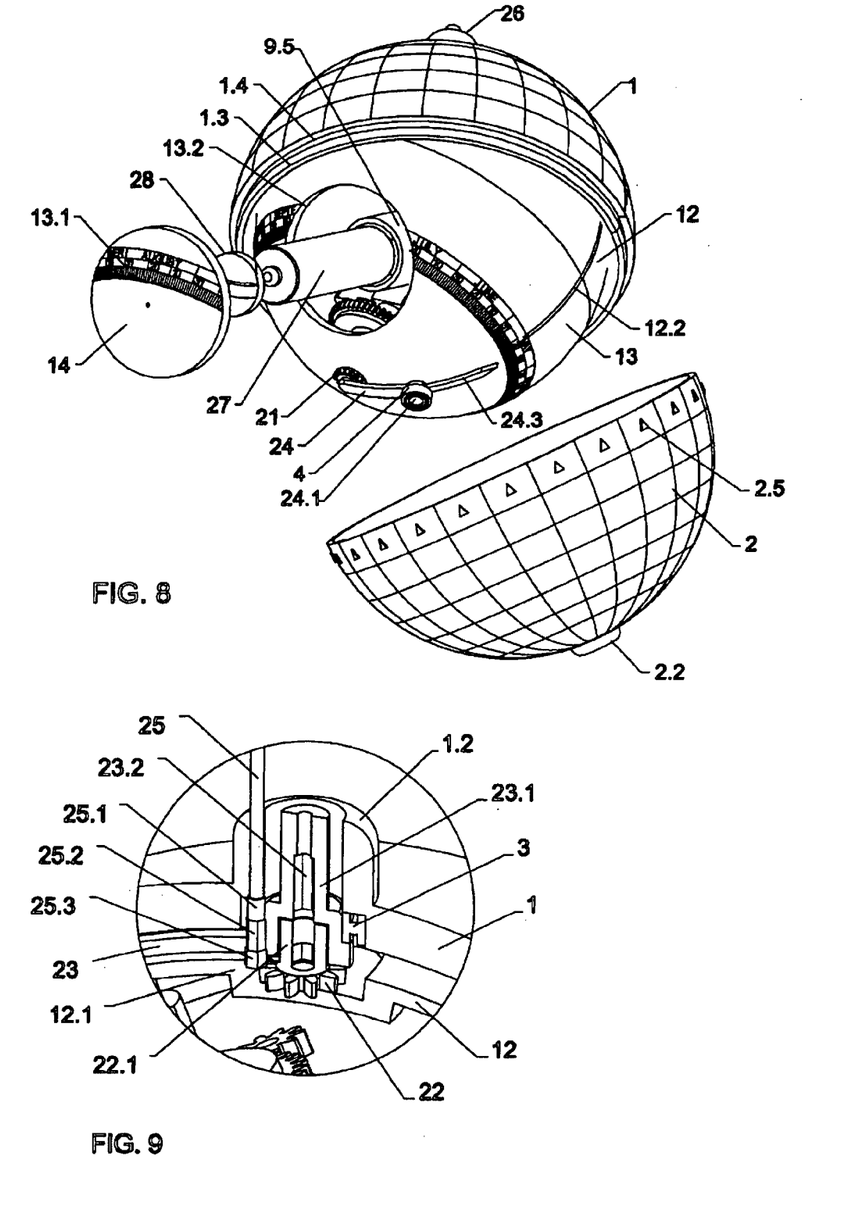
FIG. 8 is a perspective view of the Battery Replacement System.
FIG. 9 is a perspective section of the Setup System.

FIG. 8 shows us how the battery is going to be replaced. First thing is World Globe South Hemisphere (2) has to be popped-up opened to give us access to the second globe, then the Day-Night Globe Lid has to be removed by using a extended clip wire introduced through its tiny opening hole (14.1) and pulling it out. Then the Battery Housing Lid (28) may be unthreaded form its place and the battery replaced. The parts have to be replaced into position following the backwards process. Some other elements are depicted in this figure that were previously explained.

FIG. 9 is a sectioned perspective of the Setup Mechanism that is located at the North Pole. The Setup Stick (25) is a tiny cylinder with 4 different sections, the lowest is the thickest one with a Hexagonal Section (25.3), the next upper section has a smaller Hexagonal Section (25.2), and the next upper section is a Cylinder (25.1) with a diameter smaller that the previous hexagon, and finally the upper body of the stick is the smaller diameter Cylinder (25). This stick normally lays loosed in to the setup stick cavity. The Setup stick cavity is formed inside Year Setup Pinion (22) and the Setup Housing Pivot (23.1) that is part of the North Arm (23). The Year Setup Pinion (22) is in mesh with the Setup Gear Molded on top of the Day-Night Globe North Hemisphere (12) and it has three different hollow sections inside prepared to track the Setup Stick (25). The North Arm (23) also has three different hollow sections allowing the Setup Stick (25) to be tracked in it. When the Setup Stick is pulled upwards with one click tracks the hollow hexagon in the Year Setup Pinion (22), in this way the Day-Night Globe may be manually revolved about its slopped axis from the North Pole, at this point inside of the Day-Night Globe (12) the Year Pressure Clutch (15) slides over Year Friction Gear (17) releasing the globe form the mechanism allowing the setup process without impacting the driving system. The date of the year may be then easily setup by matching the Month-Day Dial (13.1) current date with the Day-Month Pointer Hand (24.3). When the Setup Stick (25) is pulled upwards with a second click, the Year Setup Pinion is released and the Setup Housing Pivot (23.1) is tracked. In this way the Double Axis System may be manually rotated on its North-South Axis, at this point inside of the Day-Night Globe (12) the Day Pressure Clutch (16) slides over Day Friction Gear (18) releasing the Double Axis System form the mechanism and allowing the setup process without impacting the driving system. The time of the day may be then easily setup by matching the current time depicted in the Band Hour (29) with the Time Reading Pointer (2.5) located in your Geographical Standard Time Band. In other words if you know in what Standard Band you are at you can set the clock up.

Figure 10:
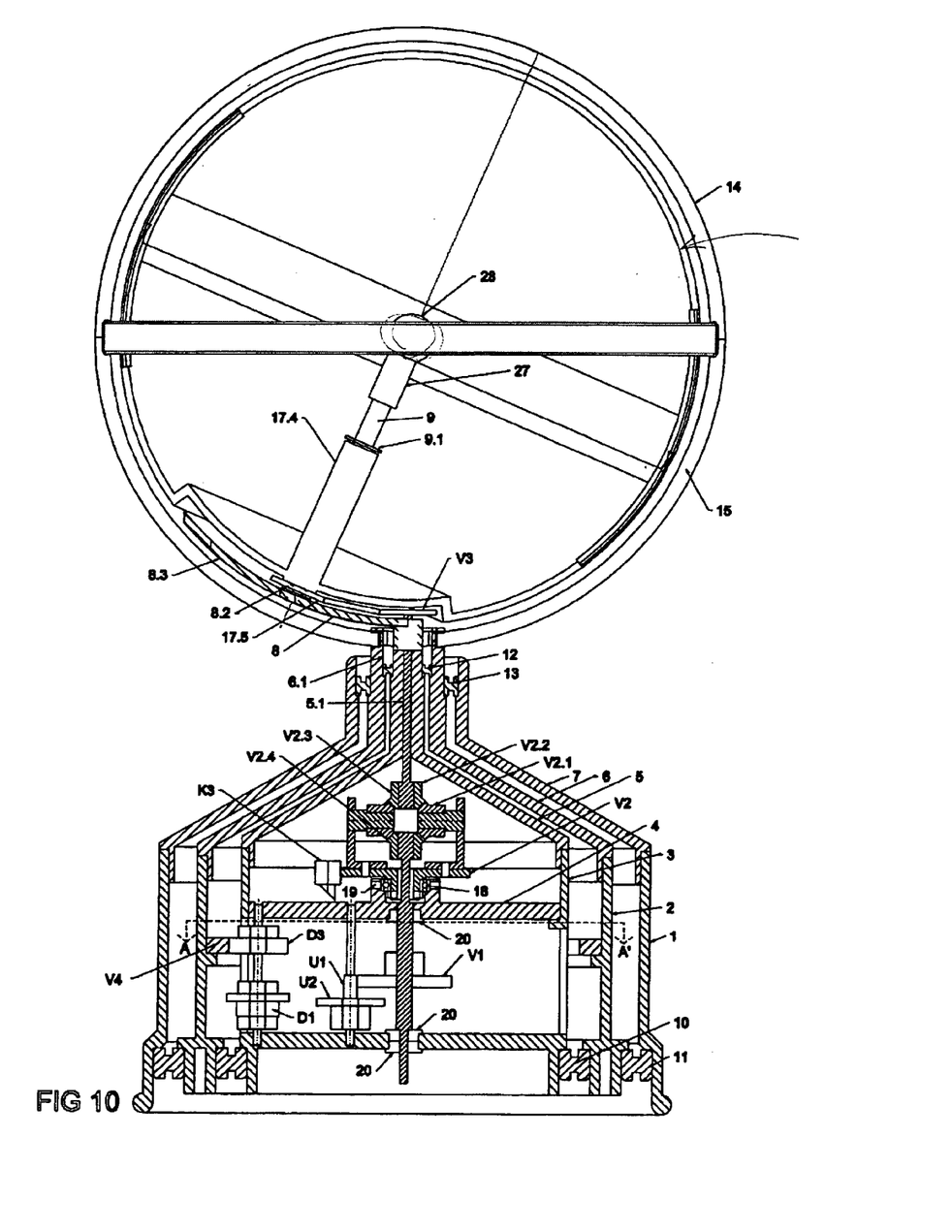
FIG. 10 is physical arrangement of Based World Globe Clock.

FIG. 10 is a Single Line Diagram of the Electric System.

Figure 11:
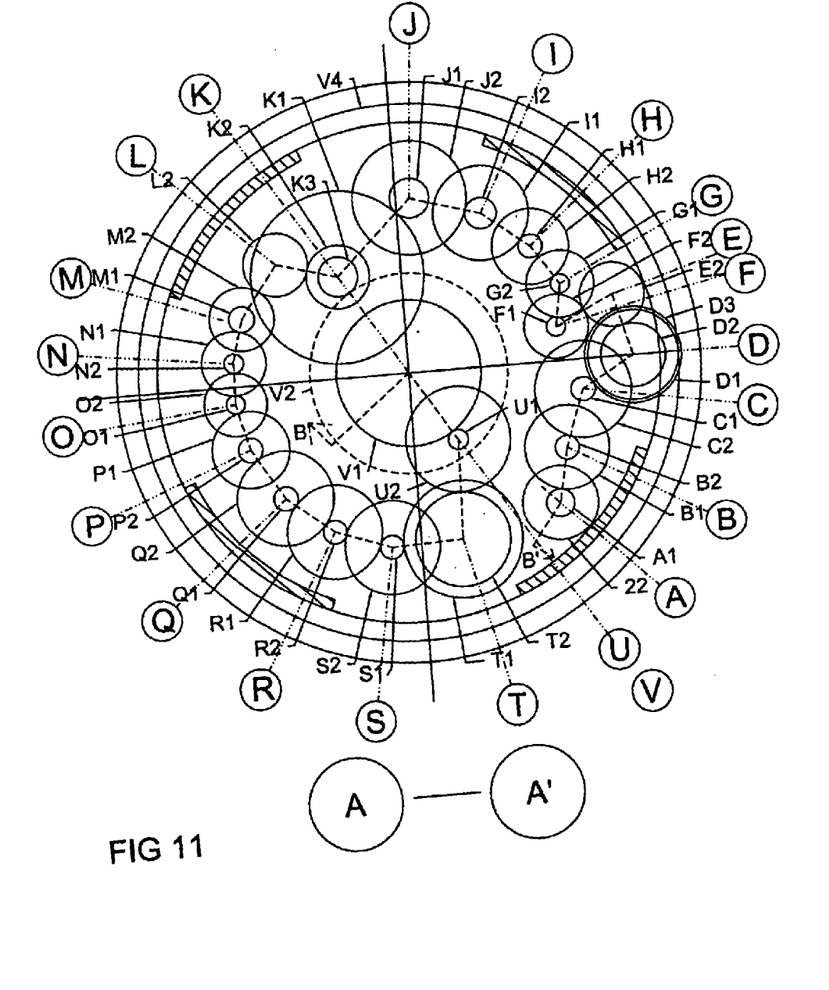
FIG. 11 is a partial plan view section of FIG. 10 representing the Train of Gears.

FIG. 11 is an illustration of what World Globe Clock arrangement would be if we switch form two-motor-driver system to the alternative one motor and train of gears driver system. This application may be built in different sizes from a marble size to a giant size and may be presented in many styles; it is intended by this patent to cover any of these possibilities. Based World Globe Clock. The Based World Globe Clock may use either a Transparent Earth Globe with a Day-Night Globe inside or a Translucent Globe with a Rotating Plate Shaped Light Shield inside.

Figure 12:
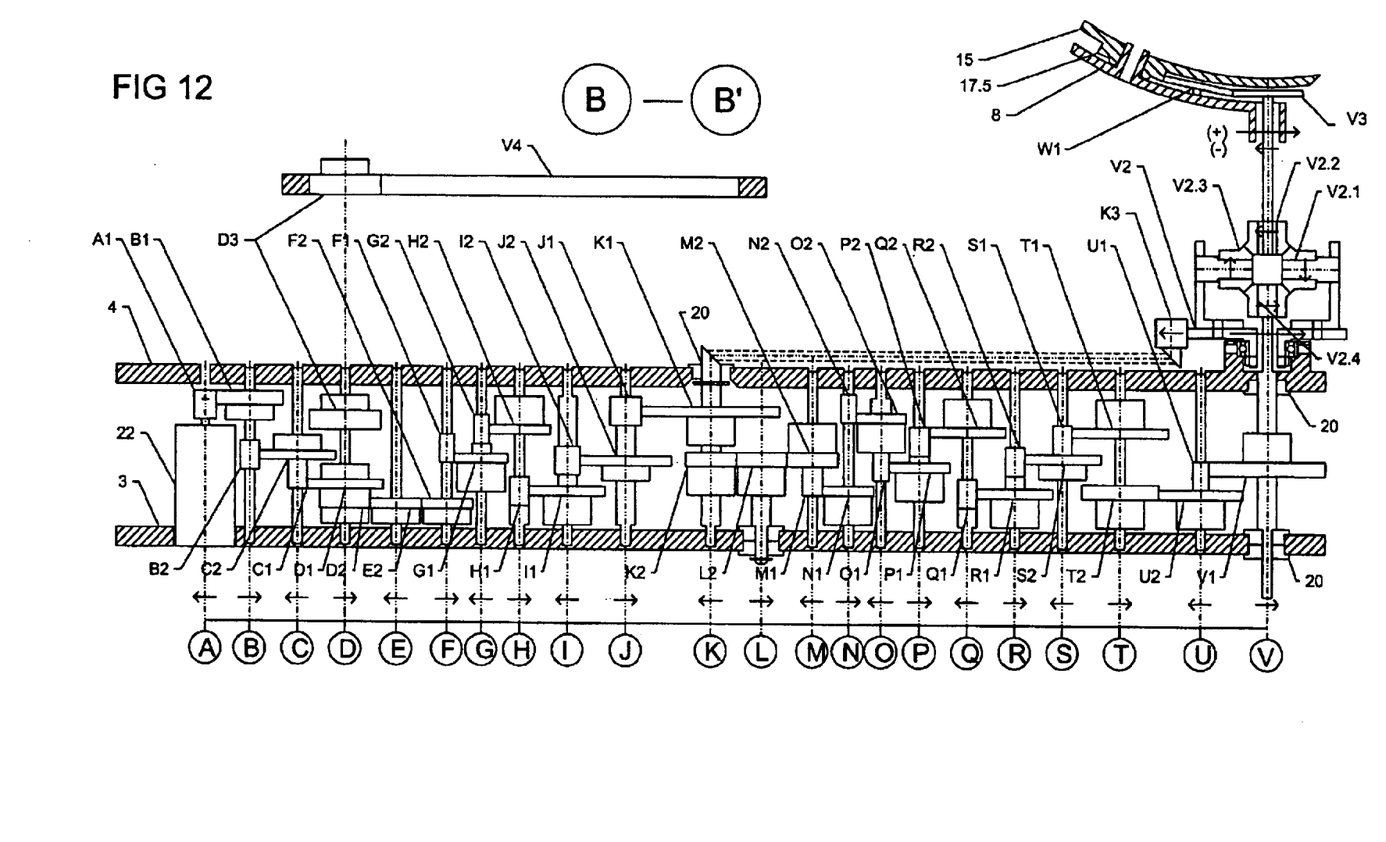
FIG. 12 is an unfolded section of a train of gears that delivers a 1:366.2421927519 ratio.

FIG. 12 is a section of what the Base World Globe Clock may look like, in this section the train of gears is partially represented for clarity. The basic mechanism that was explained previously in FIG. 2 is mounted here on a Housing Cylinder (1) allowing the whole system its free rotation for convenience of the user. Day-Night Globe Extended Cylinder (3) and its Cap (5) are fixedly connected to each other and it is named for explanation purposes the Day-Night Cylinder, World Globe Extended Cylinder (2) and its Cap (6) are fixedly connected to each other and I will name them the World Cylinder for explanation purposes, Housing Cylinder (1) is fixedly connected to its Cap (7) and it is named the Exterior Cylinder for explanation. The Day-Night Cylinder is pivotally nested by means of bearings (10) and (12) inside the World Cylinder, which is itself pivotally nested by means of bearings (11) and (13) in the Exterior Cylinder. This allows the Day-Night Cylinder free rotation inside the World Cylinder and the World Cylinder free rotation about the Exterior Cylinder. The Transparent or Translucent World Globe formed by two Hemispheres (14) and (15) is fixedly attached to World Globe Extended Cylinder Cap (6) at its upper end. Arm (8) is fixedly connected to The Day-Night Cap (5) and the Slopped Axis (9) is fixedly attached to Arm (8) on its Female Axis Connector (8.2), The Day Night Globe formed by Hemispheres (16) and (17) is pivotally mounted to Slopped Axis (9) through its Connecting Tube (17.4) and loosely secured to it by the ring (9.1). This arrangement allows the Day-Night Globe (16)/(17) to be carried in a slopped position by the Day-Night Cylinder on its motion around the vertical north-south axis. Inside the Day-Night Extended Cylinder (3) the driving mechanism is housed. In this option I am showing as a driver a Stepper Motor and Train of Gears Driving System. This driving system may be also applied to World Globe Clock alternative. The train of Gears that will be explained in FIGS. 13 and 14 is pivotally place in to its position by means of the Blind Holes (3.1) located on the lower floor of the Day-Night Globe Extended Cylinder (3) and the Holding Plate (4) that is provided with holes to fit the train of gear shafts. After the Train is place into position the Holding Plate (4) has to be secured with screws to the Day-Night Globe Extended Cylinder (3). Planetary Gear (X4) is fixedly mounted to World Globe Extended Cylinder (2) and secured with screws. The most Important ends of the train of gears are shown in this figure: Gear D3 that tracks Planetary Gear (X4). This gear (D3) is mounted in a Pressure Clutch System similar the one explained in the World Globe Clock option, this clutch is not shown here for clarity. Gear V1 is also mounted on a Pressure Clutch that is not shown for clarity too. The Differential Arrangement formed by the Main Differential Gear (X2), the Beveled Spinning Gears (X2.1) and (X2.3) that are mounted on (X2), High Pressure Gear (X2.4) and Low Pressure Gear (X2.2) is also depicted. This differential Gear arrangement is mounted on bearing (18) right at the center of Holding Plate (4). The bearing is secured to the holding plate by means of screws (19). Low pressure Gear (X2.2) shaft extends upwardly thorough a Shaft Passing Hole (5.1) in Day-Night Extended Cylinder Cap (5) up to Gear (X3), here Gear (X3) tracks Gear (Y1) that is directly mounted on Arm (8) and this gear (Y1) tracks the Globe Gear (17.5) that is molded on the lowest end of the Day-Night Globe (17). High Pressure Gear (X2.4) Shaft extends downwardly thorough Holding Plate (4) and Day-Night Extended Cylinder (3) Floor to the exterior where the Year Setup Handle (24) is attached to it; by turning this handle we can directly turn the Day-Night Globe (16)/(17) and setup the current Month and Day as easy as explained for World Globe Clock option. Pressure Clutch in Gear (V1) releases the mechanism for setting up the date of the Year. Day Setup Handle (25) is molded on the lowest face of Day-Night Extended Cylinder (3) floor. By turning this handle the whole Day-Night Cylinder turns and as a direct result Arm (8) also turns in the vertical axis. This way current hour and minute may be setup as easy as explained for the World Globe Clock option. Pressure Clutch in Gear (D3) releases the mechanism for setting up the time of the day.

FIG. 13 is a section in plan view of the Train of Gears option that make possible a 1:366.2421927519 between shafts. In this illustration the Differential Arrangement is represented with a dotted Circle at the center because is placed above the Section Cutting Line A-A' in FIG. 12. FIG. 14 may be seen in combination with FIG. 13 to understand the train gears. Axes are radial distributed form the center of the arrangement and are represented by hatched-dotted lines with circled letters at their ends. The exterior hatched element is the World Globe Cylinder (2), the next space going towards the center is Planetary Gear (X4) that is fixedly mounted or may be molded into World Globe Cylinder (2). The next is the space separation between the Planetary Gear (X4) and the Day-Night Cylinder (3). Then the next dotted space represents the Day-Night Cylinder (3). As you may notice, this cylinder has four windows distributed around its wall; these windows are intended to reduce weight and to be able to connect Gear (D3) to Planetary Gear (X4) through one of them. Before starting the Train of Gears explanation I have to make the following clarifications for better understanding: Gears and Pinions are identified by their axis identification letter and a number that relates them with the following gear they are in mesh to. The Gear Train Starts at Pinion (A1) attached to Stepper Motor (22) and has its first end at Planetary Gear (X4). The purpose of this section of the train is to provide a frequency of 366.2421927519 revolutions per year to the Day-Night Cylinder about the World Globe Cylinder. This train section is as follows: A1/B1×B2/C2×C1/D1×D3/X4=1/288. This may be reached with the following teeth ratios: 14/42×15/60×15/60×30/180=1/288. For this ratio as an example, the Motor (22) shaft must be spinning at one round every 299.1808699 seconds in order to have 366.2421927519 rounds per year; this frequency must be given with the microprocessor driving the motor (22). This section of the train of gears may be given with different gear arrangements. The rest of the Train that I am about to explain is what reduces this speed with a ratio of 1:366.2421927519. In order to do that we have to divide the train of gears into two sections, the first one start at the Planetary Gear (X4) which is providing the basic speed and ends at the Main Differential Gear (X2) with a ratio of 1:732.48 that we will call (SX2); as you may notice this speed is exactly twice slower than 1:366.24. Then From the Main Differential Gear we will continue around it up to the High Pressure Gear (X2.4) at the low end of the differential arrangement reaching a cumulated ratio of 1:61,170,869.76, we will call this speed (SX2.4). With this arrangement what is going to happen is that the Low Pressure Gear (X2.2) at the top of the arrangement will have the following resulting speed: SX2.2=(SX2)+((SX2)×(1−(SX2.4)/(SX2)). This is SX2.2=(1/732.48)+((1/732.48)×(1−(1/61,170,869.76)/(1/732.48))=1/366.2421927519. The explanation in words is as follows: The final speed of the Low Pressure Gear in the Differential will be=(The Main Differential Gear Speed)+the transferred speed that equals the remaining percentage (1-%) of the Main Differential Gear Speed, where this percentage is the division between the High Pressure Gear Speed by the Main Differential Gear Speed. The train of gears for reaching Sv2.2 will be: SX2.2=X4/D3×D2/E2×E2/F2×F1/G1×G2/H2×H1/I1×I2/J2×J1/K1×K3/X2. This may be reached with the following teeth ratios: Sv2.2=180/30×40/40×40/40×12/42×12/48×15/60×20/72×25/109×20/100=1/732.48. The 40/40 ratios are not necessary for meeting the final ratio but used in this solution to gain space and obtain the right direction of spin. The train of gears for reaching SX2.4 restarts at shaft K that has a cumulated speed of 1/146.496 as follows: SX2.4=1/146.496×K2/L2×L2/M2×M1/N1×N2/O2×O1/P1×P2/Q2×Q1/R1×R2/S2×S1/T1×T2/U2×U1/XV1×V2/W2×W1/X1=1/61,170,869.76. This may be reached with the following teeth ratios: Sv2.4=1/146.496×40/40×40/40×16/40×12/39×12/48×12/48×15/60×15/60×15/60×15/75×60/66×12/15×10/73=1/61,170,869.76.

As you may notice these final ratios may be reached with different combinations of teeth. Therefore, the combination of teeth is not intended to be part of the claims but the fact of a train with a differential arrangement for all kinds of earth clock applications. Gear (X3) will be revolving at speed SX2.2=1/366.2421927519 relative to the Day Cylinder speed. In other words Arm (8) which is attached to this cylinder will be revolving 366.2421927519 rounds per year while the Day-Night Globe will revolve only once per Year. The Based World Globe Clock has the same elements to display time the World Globe Clock has: the Hour Band (26) and the Month and Day Dial, so I will skip this explanation.

FIG. 15 is a sectioned perspective of how the Based World Globe Clock Arrangement looks like.

FIG. 16 is an Electrical Single Line Diagram.

The Based World Globe Clock may be built with interior light if desired and instead of using a Day-Night Globe, a Revolving Plate Shaped Light Shield may be used by mounting it to the Slopped Axis (9) and adapting the gear (8.2) at its bottom to track the Tropical Year Cycle from gear (Y1).

The Based World Globe Clock may be also built with a Two-MotorDriving-System as was explained in FIG. 2.

This application may be built in many different sizes and styles and it is intended by this patent to cover any of these possibilities.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A time keeping device that provides a user with the time of day at any point on earth and the current day or night condition of any point on earth, the time keeping device comprising:

an external globe having indicia for indicating time, the external globe being constructed to permit light to pass through the external globe;

An internal globe rotatably mounted within the external globe, a support mounted within the external globe, the support having a pair of axels for rotating the internal globe about the axels; and a motor, the motor rotating the internal double axis support to provide rotation and translation to the internal globe, so that the time at a particular point on the internal globe can be read by a user by peering through the external globe to see the location of the indicia as projected on the internal globe.

2. A method for keeping time, comprising:

Providing a time keeping device that provides a user with the time of day at any point on earth and the current day or night condition of any point on earth, the time keeping device comprising:

an external globe having indicia for indicating time, the external globe being constructed to permit light to pass through the external globe;

An internal globe rotatably mounted within the external globe, A planetary gear mounted from the external globe;

and a support mechanism adapted for rotating the internal globe about a pair of axes, the support mechanism having an internal double axis support, the internal double axis support having a gear mechanism that meshes with the planetary gear; and a motor, the motor rotating the internal double axis support to provide rotation and translation to the internal globe; and peering through the external globe to see the location of the indicia as projected on the internal globe to read the time at a particular location on the internal globe.

* * * * *